(12) United States Patent
Eder et al.

(10) Patent No.: US 7,244,687 B2
(45) Date of Patent: Jul. 17, 2007

(54) BATCH FOR PRODUCING A REFRACTORY CERAMIC SHAPED BODY, SHAPED BODY MADE THEREFROM, AND A USE THEREOF

(75) Inventors: Johann Eder, Leoben (AT); Rainer Neuböck, Graz (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 110 days.

(21) Appl. No.: 10/542,308

(22) PCT Filed: Dec. 6, 2003

(86) PCT No.: PCT/EP03/13823

§ 371 (c)(1),
(2), (4) Date: Jul. 15, 2005

(87) PCT Pub. No.: WO2004/065323

PCT Pub. Date: Aug. 5, 2004

(65) Prior Publication Data

US 2006/0122051 A1  Jun. 8, 2006

(30) Foreign Application Priority Data

Jan. 17, 2003  (DE) ................ 103 01 881

(51) Int. Cl.
C04B 35/043  (2006.01)
C04B 35/057  (2006.01)

(52) U.S. Cl. ............ 501/112; 501/113; 501/115

(58) Field of Classification Search .......... 501/113
See application file for complete search history.

(56) References Cited

U.S. PATENT DOCUMENTS 3,210,205 A  10/1965  Shurtz
3,523,804 A * 8/1970  Fukatsu et al. ......... 501/112
3,948,671 A   4/1976  Guile et al.

FOREIGN PATENT DOCUMENTS

| DE | 100 10 918 A1 | 6/2000 |
| EP | 0019995 | 4/1980 |
| GB | 668187 | 3/1952 |
| GB | 897357 | 5/1962 |
| GB | 938040 | 9/1963 |

OTHER PUBLICATIONS

Routschka, "Feuerfeste Werkstoffe", section 4.2.6.1, pp. 170-176.

* cited by examiner

*Primary Examiner*—Karl Group
(74) *Attorney, Agent, or Firm*—Christopher L. Parmelee; Walker & Jocke LPA

(57) ABSTRACT

The invention relates to a composition for the production of a refractory ceramic moulded body, a non-fired or fired moulded body formed from the composition and a possibility for use.

20 Claims, 1 Drawing Sheet

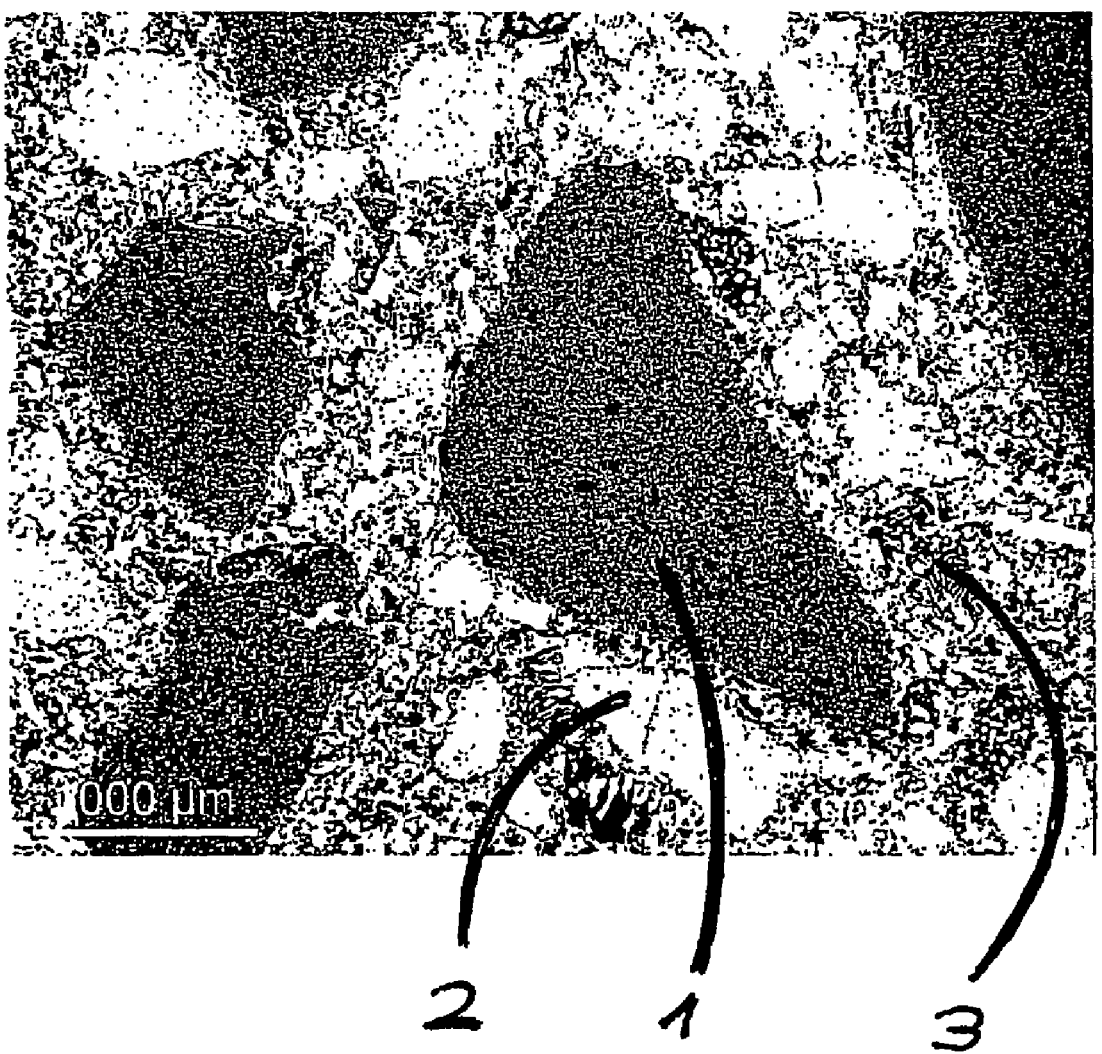

BATCH FOR PRODUCING A REFRACTORY CERAMIC SHAPED BODY, SHAPED BODY MADE THEREFROM, AND A USE THEREOF

The invention relates to a composition for the production of a refractory ceramic moulded body, a non-fired or fired moulded body formed from the composition and a possibility for use.

Refractory ceramic products are subdivided into basic and non-basic products, for example. The basic products include those based on MgO (magnesia) such as magnesia products or magnesia-chromite products.

Such, in particularly purely magnesitic, types exhibit an excellent abrasion resistance, frequently however, an unsatisfactory infiltration behaviour vis-à-vis metallurgical slag such as those typical in processes for the production of stainless steel, for example. Such processes are known as AOD (=argon-oxygen decarb processes) or VOD (=vacuum-oxygen decarburisation processes). The detaching behaviour, too, is unsatisfactory.

Apart from these purely magnesitic types, fired (including carbon-bound) bricks are known which contain at least a considerable proportion of dolomite [$CaMg(CO_3)_2$] in the fired form. Depending on the deposit, the content of MgO or CaO of the dolomite varies. In terms of order of magnitude it amounts to 60% by weight CaO and 40% by weight MgO. $SiO_2$, $Fe_2O_3$, $Al_2O_3$, MnO (<3% by weight) in the form of their calcium compounds are present as secondary components. Routschka "Feuerfeste Werkstoffe" (refractory materials), ISBN 3-8027-3144-1), section 4.2.6.1 suggests a typical $SiO_2$ content of 0.5 to 1.5% by weight, a typical $Fe_2O_3$-content of 0.5 to 1.0% by weight and a typical $Al_2O_3$ content of 0.2 to 0.8% by weight.

Depending on whether the compositions consist exclusively of dolomite or predominantly of dolomite (apart from additions of magnesia), the moulded parts formed therefrom are referred to as dolomite products or magdol products. Dolomite as a component of the composition means calcined dolomite or sintered dolomite, i.e. components containing CaO+MgO, in each case.

The wear of a dolomite or magdol brick is considerably greater than in the case of a pure magnesia brick. Such moulded parts containing CaO+MgO, however, have a substantially lower infiltration tendency and detach themselves less easily.

In DE 100 10 918 A1, a composition for the production of a refractory ceramic moulded body is disclosed which comprises the following independent components:
a) 80 to 97% by weight of fused magnesite, sintered magnesite or mixtures of these with an MgO content of >93% by weight and a grain size of <8 mm,
b) 3 to 20% by weight of CaO in a grain fraction of <1 mm.

An essential aspect is that calcium oxide is added as an independent component of the magnesitic main component.

The moulded parts formed from this composition represent a quasi compromise between the known magnesia and magdol products. When using corresponding products, the expected improvement in the resistance to abrasion and the lower infiltration tendency is achieved; however, detachments can also take place.

The invention is based on the task of improving the moulded bodies known from DE 100 10 918 regarding their tendency to detach themselves without having to forego the good abrasion and corrosion resistance properties (as in the case of purely magnesitic moulded bodies) and the resistance to infiltration.

The invention is based, in this connection, on the following considerations: the side of a refractory ceramic moulded body which is facing the fire (the melt) is at a particular risk of detaching itself. This side is exposed to the highest temperatures (partially of more than 1,700° C.). Consequently, it was the aim of the development to improve the properties of the product regarding its softening under pressure (according to DIN-EN 993-8, 1997) and to make the structure more flexible. This is achieved by the following means. Small proportions of molten phase are admitted without negatively influencing the refractory properties. In this way, the thermal expansion, in particular, of MgO can be compensated. Thermomechanical tensions are avoided. Detachments (so called "spalling") can be prevented or at least reduced.

Consequently, the invention deviates from the teaching of DE 100 10 918 A1 of adding CaO as an independent component in maximum purity to the composition. Instead, a CaO-containing component is used in the composition in a controlled manner, which component is capable of introducing different foreign oxides, such as $Fe_2O_3$, into the composition. In this way, dicalcium ferrite, among other things, is formed as secondary phase during firing of moulded body produced from the composition. Dicalcium ferrite provides the moulded body at elevated temperatures (application temperature) with a certain structural elasticity such that stresses can be better absorbed and/or reduced. Moreover, iron oxide acts as a mineraliser when firing brick.

According to the invention, the iron oxide content (of the composition) can be between 1 and 8% by weight.

Consequently, the invention deviates deliberately from the requirement of the state of the art of taking into account as little $Fe_2O_3$, in any case <1.0% by weight, in the composition.

One possibility of adjusting the $Fe_2O_3$ content consists of using dolomite rich in iron oxide, for example. In this way, a proportion of MgO is introduced into the composition simultaneously. A further proportion of MgO is provided by a purely magnesitic component, e.g. fused magnesia or sintered magnesia.

A further essential differentiation criterion with respect to the composition according to DE 100 10 918 A1 consists of the selection of the grain sizes for the individual components. Whereas, in the state of the art, the CaO-containing component is to be used in a grain fraction of <1 mm, both the component containing MgO and that containing CaO in the case of the invention can be present in the composition in a grain size of <8 mm. According to one embodiment, the CaO-containing component can have a grain size of >2 mm and/or <5 mm. This does not preclude the possibility of using also a CaO-containing component or CaO fraction with a proportion of fine grains of <1 mm or even <0.3 mm. This can be a component of the composition which is independent of the coarse component (>2 mm).

For the MgO-containing component, insofar as it has not already been taken into account as dolomite, the grain sizes are in particular in the region of <4 mm. For example, ⅕ to ½ of this MgO component can be <0.3 mm, the remainder >0.3 mm.

In its most general embodiment, the invention relates to a composition for the production of a refractory ceramic moulded body which comprises at least one component containing MgO and CaO in a grain size of <8 mm and has the following oxide analysis:

a) 50 to 90% by weight of MgO
b) 8 to 40% by weight of CaO,
c) 1 to 8% by weight of $Fe_2O_3$,
d) up to 10% by weight of others.

The sum total of a) to d) should be 100% by weight. Any binder, water etc. is calculated separately.

The moulded parts formed from this composition can be classified as magnesia products comprising additions containing CaO and $Fe_2O_3$ from the composition, these additions providing the fired product with properties that have previously been obtained only with products having a high CaO content. Moreover, it is possible to achieve excellent corrosion properties with moulded parts made from this composition, as in the case of pure magnesia bricks. These properties are combined with a good infiltration resistance and improved structural elasticity such as they have been known previously only in the case of purely dolomitic moulded bodies. All moulded parts such as bricks, panels, rings etc. are moulded bodies.

The attached illustration shows a polished face of a brick according to the invention in the indicated magnification.

The structure of the brick is determined by coarse dolomitic grains (1) with an $Fe_2O_3$ content of approximately 3% by weight. Between these coarse (in the polished face: dark) grains, comparatively smaller MgO grains (2) can be discerned between which MgO—CaO melt additions (3) can be discerned.

The product illustrated which was fired at 1,550° C. has the following characteristic values:

| | | | |
|---|---|---|---|
| Raw density | DIN EN 993-1: 1995 | g/cm² | 3.05 |
| Open porosity | DIN EN 993-1: 1995 | Vol. % | 13 |
| Gas permeability | DIN EN 993-4: 1995 | nPm | 4 |
| Compressive strength in the cold | DIN EN 993-5: 1998 | MPa | 70 |
| Softening under pressure $T_{o, 5}$ | DIN EN 993-8: 1997 | ° C. | 1650 |

An example of the composition is:

| | |
|---|---|
| Sintered magnesia [1] (0.3–4 mm) | 33% by weight |
| Sintered magnesia [1] (<0.3 mm) | 12% by weight |
| CaO + MgO sintered material [2] (2 to 5 mm) | 35% by weight |
| CaO + MgO fused material (<0.3 mm) | 30% by weight |

[1] with 96% by weight of MgO
[2] with 41% by weight of CaO and 3.8% by weight of $Fe_2O_3$.

The total MgO content is approximately 71% by weight, the total CaO content approximately 26% by weight, the total $Fe_2O_3$ content approximately 1.6% by weight.

The bricks fired from this working material mixture (composition) at 1,400° C. have a value of $T_{0.5}$ of 1,520° C. and an excellent resistance to detaching.

As detailed above, the MgO-containing component can consist of sintered magnesia, for example, with a grain fraction of <5 mm. A portion of the MgO is provided by a coarse grain of sintered dolomite in a fraction of 2 to 8 mm.

The proportion of MgO and CaO can also be introduced into the composition via a so called MgO+CaO molten material (co-smelter) [(3) in the illustration of the polished phase].

Insofar as no sintered dolomite is available in order to achieve the required proportion of $Fe_2O_3$. in the composition, the iron oxide can be admixed by foreign components, e.g. in the form of scale.

As a rule, the iron oxide content will be >1.4% by weight, e.g. 1.5 to 2% by weight, however, it can also be adjusted to values of >2% by weight, e.g. 2 to 4% by weight, an upper limit of 3% by weight being frequently sufficient to achieve the desired structural flexibility. The structural flexibility can also be characterised as follows:

The test for softening under pressure according to DIN EN 993-8 (1997) provides $T_{0.5}$ values of between 1,400° C. and 1,700° C., values between 1,500° C. and 1,650° C. being advantageous.

The other foreign oxides such as $Al_2O_3$, MnO and $SiO_2$ can be adjusted to values of <2 or <1% by weight, in each case.

The MgO-containing component, insofar as it is introduced as pure magnesitic component, should have a degree of purity of >90% by weight, in particular >95% by weight.

The mean grain size ($d_{50}$) of the CaO-containing component can be selected to be larger than the mean grain size ($d_{50}$) of the MgO-containing component, the MgO-containing component being intended to have a degree of purity of >90% by weight, in particular >95% by weight.

According to one embodiment, the above-mentioned ratio also applied regarding a grain size of "$d_{95}$" in each case.

Within the oxide analysis indicated, non-fired ceramic moulded bodies can be produced using the above-mentioned components containing MgO and CaO, a binder being usually admixed to the composition. The binder can be a carbon-containing temporary binder such as paraffin, for example.

From this non-fired product, a fired moulded body can be produced directly, the firing process taking place in a standard oven at temperatures above 1,400° C.

The components of the composition, their grain size and the firing temperature can be selected in such a way that the fired moulded body has a raw density of >3 g/cm³. The raw density leads to a relatively low open porosity which, according to one embodiment, is indicated as being <14% by volume, values of <13.5 or <13% by volume being aimed at.

The porosity and raw (apparent) density is responsible for the required infiltration resistance. The products have a good resistance to detaching and a high resistance to corrosion. They are also suitable for difficult fields of application in steel manufacture and in rotary ovens, e.g. for the production of cement. The content of $Fe_2O_3$ can also be above 4% by weight, e.g. 6 or 8% by weight, the structural flexibility being further increased at low application temperatures.

The invention claimed is:

1. A fired ceramic moulded body, made of a composition which comprises at least one purely magnesitic component and at least one component containing CaO, all in a grain size <8 mm, and which composition has the following oxidic analysis:

a) 50 to 90% by weight MgO,
b) 8 to 40% by weight CaO,
c) 1 to 8% by weight $Fe_2O_3$,
d) up to 10% by weight others,
the sum total of a) to d) being 100% by weight, the moulded body having a test value $T_{0.5}$ according to DIN EN 993-8 (1997) of between 1,400 and 1,700° C., and comprising dicalciumferrite.

2. Moulded body according to claim 1 with a density of >3 g/cm³.

3. Moulded body according to claim 1 with an open porosity of <14% by volume.

4. Moulded body according to claim 1 in which the purely magnesitic component has a degree of purity of >90% by weight MgO.

5. Process for the production of a fired ceramic, $Fe_2O_3$ comprising moulded body, with a test value $T_{0.5}$ according to DIN EN 993-8 (1997) of between 1400° C. and 1700° C., the process comprising:
  forming a moulded body using a composition comprising at least one purely magnesitic component and at least one component containing CaO, all in a grain size of <8 mm and which composition has the following oxidic analysis:
  a) 50 to 90% by weight of MgO,
  b) 8 to 40% by weight of CaO,
  c) 1 to 8% by weight of $Fe_2O_3$,
  d) up to 10% by weight others,
  the total sum of a) to d) being 100%, and
  firing the composition at a temperature >1400° C. which firing forms dicalciumferrite as a secondary phase.

6. Process according to claim 5 in which at least one CaO-containing component of the composition has a grain size of >2 mm.

7. Process according to claim 5 in which at least one CaO-containing component of the composition has a grain size of <5 mm.

8. Process according to claim 5 in which the purely magnesitic component of the composition has a degree of purity of >90% by weight and a grain size of <5 mm.

9. Process according to claim 5 in which the purely magnesitic component of the composition has a degree of purity of >90% by weight and a grain size of <2 mm.

10. Process according to claim 5 in which the purely magnesitic component of the composition has a degree of purity of >90% by weight has and a grain size of <0.3 mm.

11. Process according to claim 5 in which the mean grain size ($d_{50}$) of the CaO-containing component of the composition is greater than the mean grain size ($d_{50}$) of the purely magnesitic component of the composition.

12. Process according to claim 5 in which the grain size ($d_{95}$) of the CaO-containing component of the composition is greater than the grain size ($d_{95}$) of the purely magnesitic component of the composition.

13. Process according to claim 5 in which at least one CaO-containing component of the composition has a grain size of <1 mm.

14. Process according to claim 5 in which at least one CaO-containing component of the composition has a grain size of <0.3 mm.

15. Process according to claim 5 with a $Fe_2O_3$ content of the composition of >1.5% by weight.

16. Process according to claim 5 with a $Fe_2O_3$ content of the composition of >2% by weight.

17. Process according to claim 5 with a proportion of an MgO—CaO fused grain component in the composition.

18. Process according to claim 5 in which the oxidic analysis of the composition exhibits at least one of the following oxides: MnO, $TiO_2$, $ZrO_2$, $SiO_2$.

19. Process according to claim 5, in which the purely magnesitic component has a degree of purity of >90% by weight.

20. Process according to claim 5, comprising lining a rotary kiln using the moulded body.

* * * * *